United States Patent [19]

Carcia et al.

[11] 4,329,031
[45] May 11, 1982

[54] PHOTOGRAPHIC SYSTEM FOR VARYING FLASH FIRE APERTURE AS A FUNCTION OF AMBIENT SCENE LIGHT

[75] Inventors: Peter P. Carcia, Reading; George D. Whiteside, Lexington; Arthur N. Woodbury, Acton, all of Mass.

[73] Assignee: Polaroid Corporation, Cambridge, Mass.

[21] Appl. No.: 230,491

[22] Filed: Feb. 2, 1981

[51] Int. Cl.³ .............................................. G03B 15/05
[52] U.S. Cl. .................................. 354/23 D; 354/27; 354/33; 354/34; 354/137
[58] Field of Search ................ 354/25 R, 25 A, 25 N, 354/23 P, 31 F, 27, 32–35, 160 F, 129, 139, 149, 195, 196, 137, 138, 23 D

[56] References Cited

U.S. PATENT DOCUMENTS 4,188,103  2/1980  Biber et al. ............................. 354/27
4,192,587  3/1980  LaRocque et al. .................... 354/27

Primary Examiner—L. T. Hix
Assistant Examiner—William B. Perkey
Attorney, Agent, or Firm—Edward S. Roman

[57] ABSTRACT

In a photographic exposure control system of the type which provides a flash fire signal at an appropriate follow focus aperture value corresponding to the camera-to-subject distance range, the ambient scene light intensity is measured prior to exposure and thereafter utilized to progressively vary the follow focus aperture value within determinate limits in inverse corresponding relation to the progressive variation of the detected ambient scene light intensity prior to exposure.

16 Claims, 9 Drawing Figures

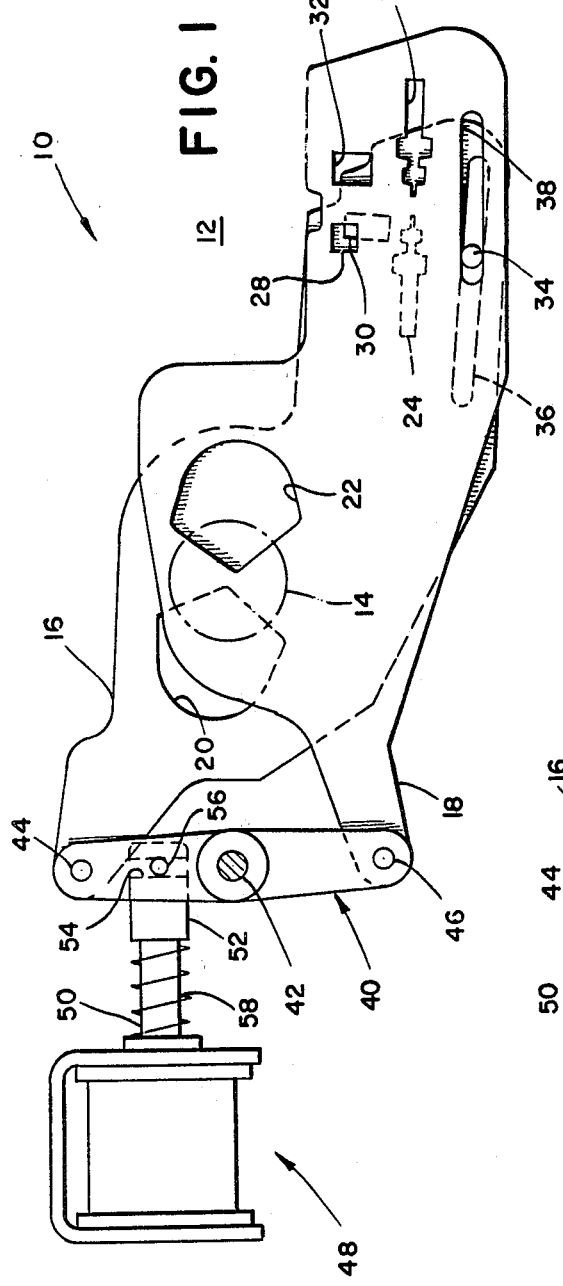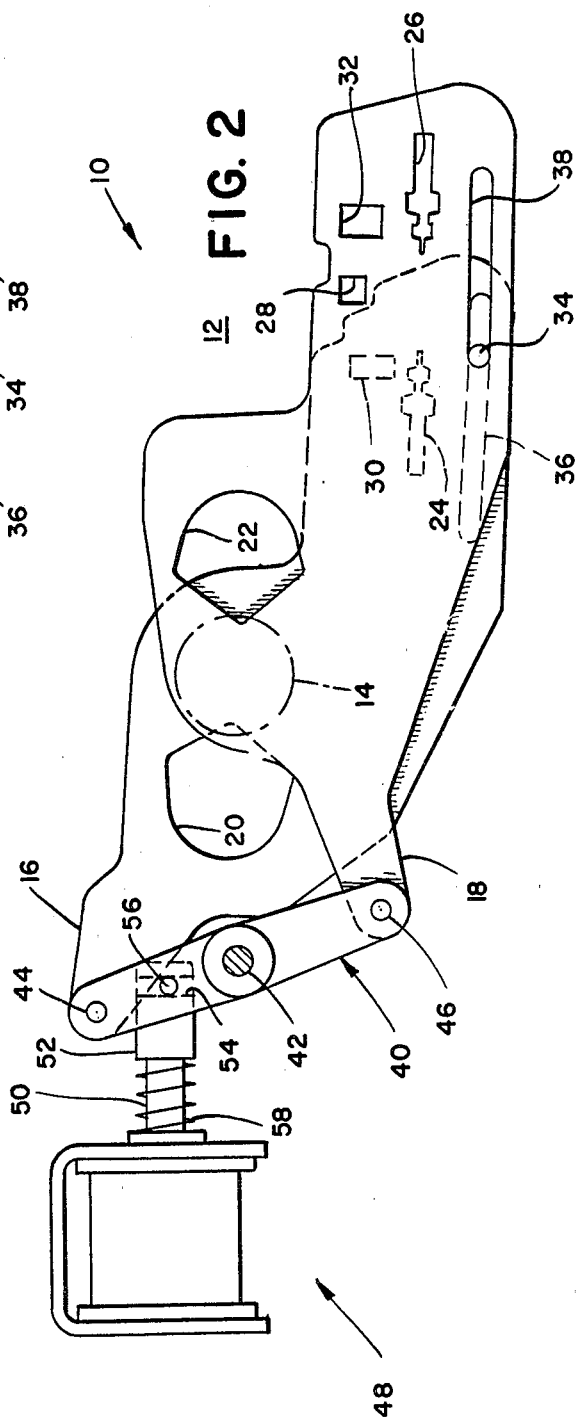

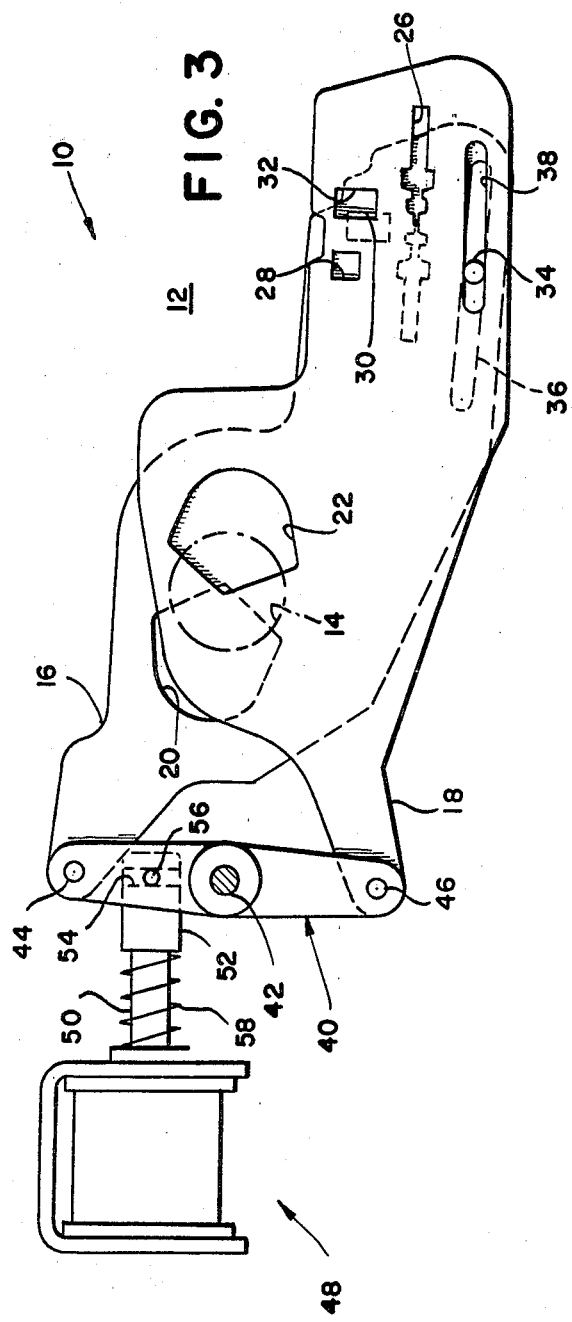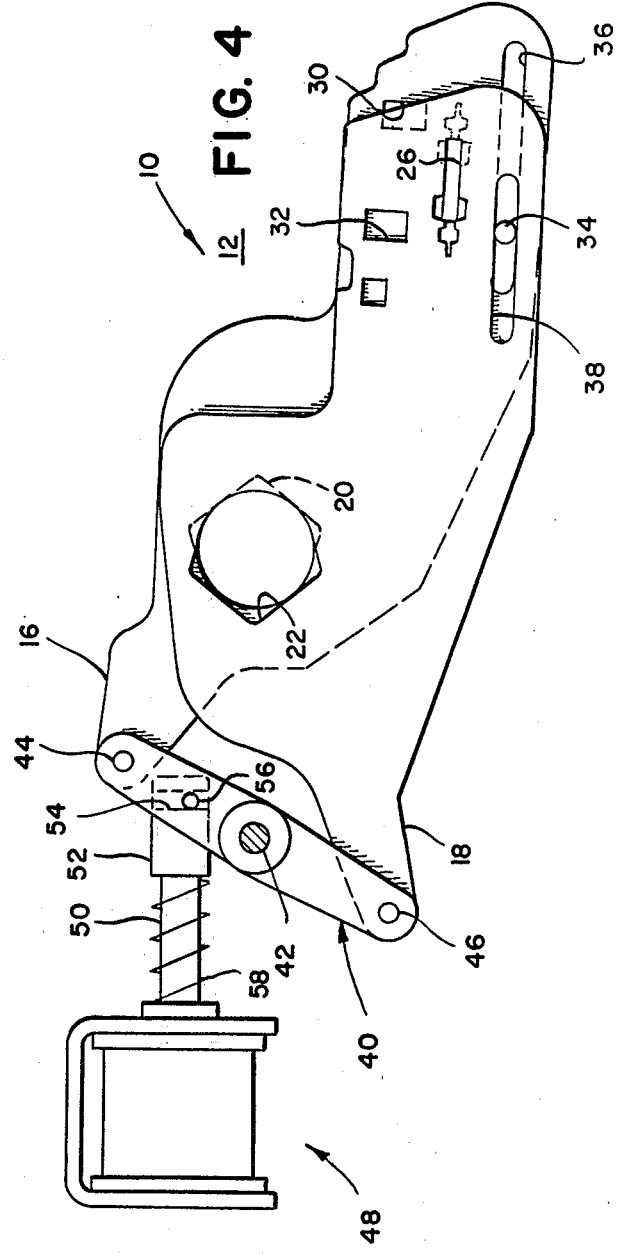

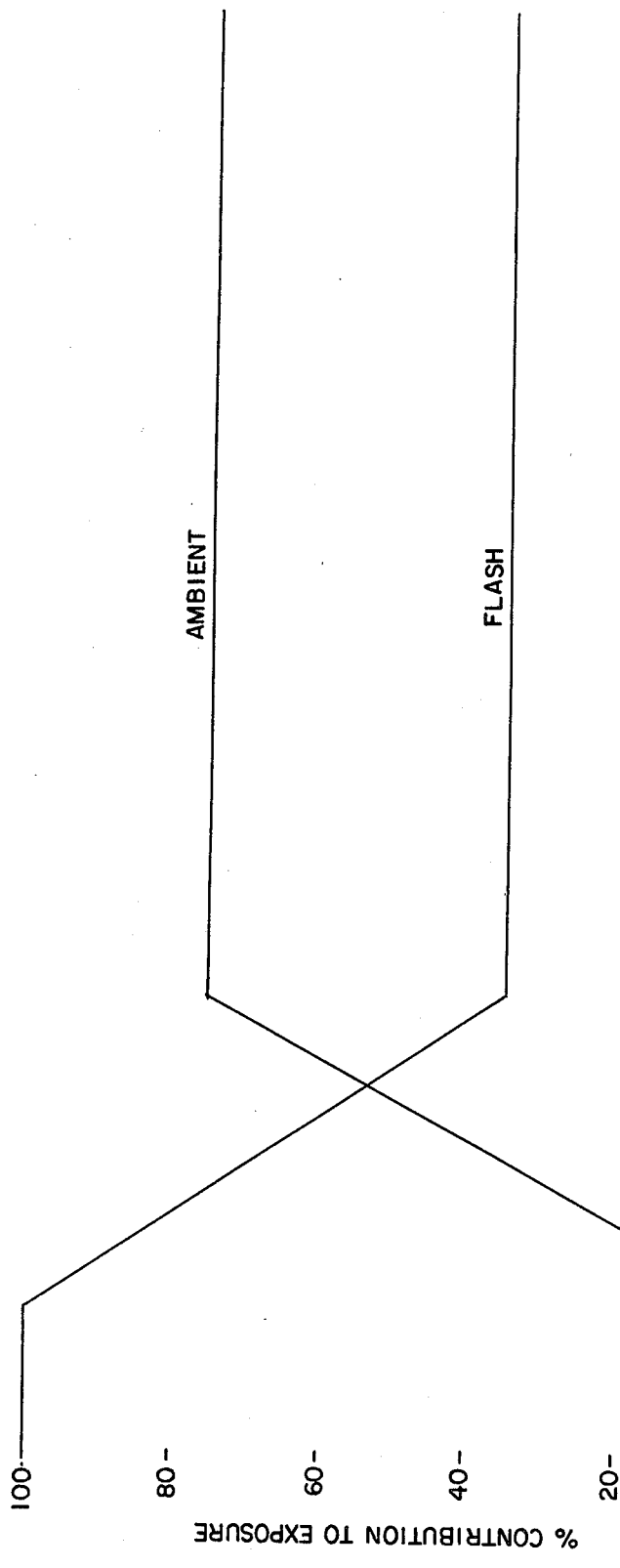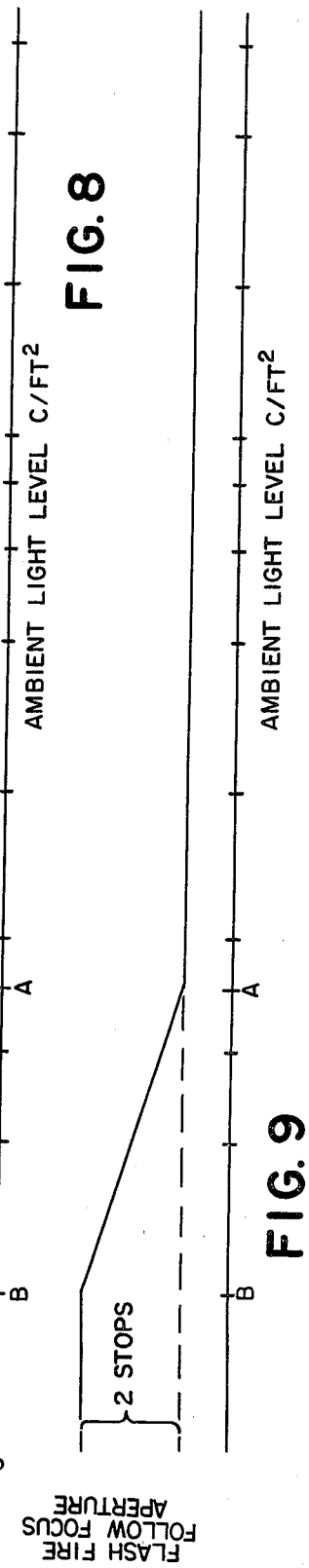

PHOTOGRAPHIC SYSTEM FOR VARYING FLASH FIRE APERTURE AS A FUNCTION OF AMBIENT SCENE LIGHT

BACKGROUND OF THE INVENTION

1. Field of the Invention

This invention relates generally to a photographic exposure control system and, more particulary, to a photographic exposure control system for adjusting the follow focus aperture in which a flash is fired as a function of a pre-exposure ambient scene light measurement.

2. Description of the Prior Art

In the photographic art, exposure control systems embodying scanning shutter blade elements which operate to vary exposure areas with time during the exposure interval are well known as indicated by U.S. Pat. No. 3,942,183, entitled "Camera With Pivoting Blades", by George D. Whiteside, issued Mar. 2, 1976, in common assignment herewith. Such scanning shutter blade mechanisms generally include a pair of counter-reciprocating blade elements each having a primary aperture that traverses the optical axis of the camera during the exposure interval. The primary apertures are shaped so that upon overlying one another during countermovement of the blades, there is defined an effective exposure aperture value which increases to a maximum value in a determinate period of time.

Exposure control is provided by a pair of secondary photocell apertures in respective shutter blade elements which admit scene light to a photoresponsive element in correspondence with the scene light admitted to the focal plane during shutter blade movement through an exposure cycle. The output from the photoresponsive element is directed to an integrator circuit which triggers upon reaching an integration level corresponding to a desired exposure value to terminate the exposure interval by returning the shutter blade elements back to their initial scene light blocking position.

Shutter mechanisms of the aforementioned type are often arranged to operate in synchronism with a source of artificial illumination such as an electronic flash or strobe. The shutter blade mechanism and strobe are generally arranged to operate in either a high ambient scene light intensity mode of operation where no artificial illumination is provided or a low ambient scene light intensity mode of operation where the strobe is fired to provide a source of artificial illumination. Under conditions of low ambient scene light intensity where the strobe is expected to be fired, the scanning shutter blade mechanism may be stopped at an aperture value corresponding to the camera-to-subject distance as determined by focusing the objective lens. Systems of the aforementioned type are generally referred to as "follow focus" systems and the maximum aperture to which the scanning shutter blade elements are allowed to open is controlled by the rangefinding or focusing system of the camera in a manner as is more fully disclosed in U.S. Pat. No. 3,977,014, entitled "Follow Focus Exposure Control System With Improved Uniform Trim Control", by Philip R. Norris, issued Aug. 24, 1976, in common assignment herewith.

Such a system need not actually stop the opening shutter blade movement at a maximum effective exposure aperture as determined by the rangefinding or focusing system of the camera but may, instead, vary the time at which the strobe light is fired during the opening shutter blade movement as determined in correspondence with the rangefinding or focusing system of the camera. Since the duration of the strobe light is short in comparison to the time required for the shutter blade mechanism to scan from its scene light blocking position to its maximum exposure aperture defining position, the aperture defined by the shutter blade elements at the instant of strobe firing for practical purposes constitutes the effective aperture by which the exposure occurs under conditions of low ambient scene light intensity. Such a system is more fully described in U.S. Pat. No. 3,478,660, entitled "Photographic Apparatus With Flash Exposure Control System", by Edwin H. Land, issued Nov. 18, 1969, in common assignment herewith. Range responsive flash firing systems of the aforementioned type can also be utilized in conjunction with sonar rangefinding devices as is more fully described in U.S. Pat. No. 4,167,316, entitled "Sonar Controlled Lens Focus Apparatus", by Bruce K. Johnson et al., issued Sept. 11, 1979, in common assignment herewith.

Exposure in artificial illumination control systems of the aforementioned type are generally intended to provide a source of artificial illumination only during the low ambient scene light intensity mode of operation. However, there may also be conditions during high ambient scene light intensity modes of operation wherein it becomes desirable to provide artificial illumination to fill in the photographic subject against a brightly back-lit scene as is more fully disclosed in U.S. Pat. No. 4,023,187, entitled "Exposure Control System With Fill Flash Race Condition", by Edwin K. Shenk, issued May 10, 1977, in common assignment herewith. The aforementioned artificial illumination control system operates under conditions of low ambient scene light intensity to fire the strobe light at a predetermined time period subsequent to the initiation of the exposure interval and under conditions of high ambient scene light intensity to fire the strobe light as a consequence of the time integration of the scene light intensity incident to the photoresponsive element reaching a predetermined value. This fill flash system, however, fails to provide a select ratio between that portion of the exposure which is directly attributable to artificial scene illumination and the remaining portion of the exposure which is directly attributable to ambient scene light illumination over a determinate range of camera-to-subject distances.

More recently, a photographic exposure and flash fire control system as disclosed in U.S. Pat. No. 4,192,587, entitled "Proportional Fill Flash", by Arthur G. LaRocque et al., issued Mar. 11, 1980, in common assignment herewith provided for the firing of a strobe in a fill flash mode of operation in a manner whereby a select ratio may be maintained between that proportion of the exposure which is directly attributable to the artificial scene illumination and the remaining proportion of the exposure which is directly attributable to the ambient scene light illumination. Such a select proportional fill flash is accomplished by providing means whereby the light integration control circuit discounts the artificial illumination provided by the strobe. Toward this end, the system includes a sample and hold circuit which operates to sample the output voltage from a photoresponsive element and to transfer the sampled output voltage directly to a light integrating circuit. However, upon the firing of the strobe, the sample and hold circuit operates to hold the sampled voltage immediately prior to the firing of the strobe and to apply the sampled voltage to the light integrating circuit for the duration of the strobe pulse. In addition, a pre-exposure ambient scene light measurement is made to determine whether the exposure is to be made in a normal flash mode of operation under conditions of ambient scene light intensity below a select level or under the fill flash mode of operation under conditions of high ambient scene light intensity above the select level. Since the electronic flash is fired at the appropriate follow focus aperture corresponding to the subject distance from the camera in the aforementioned manner, provision is made to time the firing of the flash to occur at a slightly larger follow focus aperture under conditions of low ambient scene light intensity below the selected level of ambient scene light intensity measured prior to exposure. Although selecting an exact level of ambient scene light intensity below which the flash should be timed to fire at a maximum follow focus aperture in the ordinary flash mode of operation and above which the flash should be timed to fire at a minimum follow focus aperture in the fill-in flash mode of operation may provide generally satisfactory results under most conditions, it may still be desirable under certain conditions to more precisely control the follow focus aperture at which the flash is fired.

Therefore, it is a primary object of this invention to provide a photographic exposure control system wherein the follow focus aperture at which the flash is fired for a determinate camera-to-subject distance progressively varies between minimum and maximum values in inverse corresponding relation with respect to the progressive variation in the ambient scene light intensity.

It is a further object of this invention to provide a photographic exposure control system wherein the flash is timed to fire at a maximum follow focus aperture for a determinate camera-to-subject distance under conditions of low ambient scene light intensity, a minimum follow focus value under conditions of high ambient scene light intensity, and at appropriate intermediate follow focus aperture values which progressively vary between the minimum and maximum values in inverse corresponding relation with respect to the progressive variation in the ambient scene light intensity between its high and low levels.

Other objects of the invention will be in part obvious and will in part appear hereinafter. The invention accordingly comprises a mechanism and method possessing a construction, combination of elements and arrangement of parts which are exemplified in the following detailed disclosure.

SUMMARY OF THE INVENTION

In a photographic exposure control system for use with a source of artificial illumination for controlling the exposure of a photosensitive recording medium wherein the system includes a shutter arrangement for at least initially providing progressively increasing aperture values at a predetermined rate during an exposure interval within which scene light is transmitted to the photosensitive medium following actuation thereof and means for determining the distances of a photographic subject from the system and for producing a flash fire signal responsive to the determined subject distance at an appropriate follow focus aperture value corresponding to the subject distance during the exposure interval, there is provided an improvement comprising means responsive to the pre-exposure detection of ambient scene light intensity above a first select level and below a second select level greater than the first select level for progressively varying the appropriate follow focus aperture value at which the flash fire signal is provided in inverse corresponding relation to the progressive variation of the detected ambient scene light between the first and second levels for a determined subject distance.

DESCRIPTION OF THE DRAWINGS

The novel features that are considered characteristic of the invention are set forth with particularity in the appended claims. The invention itself, however, both as to its organization and its method of operation, together with other objects and advantages thereof will be best understood from the following description of the illustrated embodiment when read in connection with the accompanying drawings wherein:

FIG. 1 is a front elevational view showing portions of the exposure control system of this invention;

FIG. 2 is a front elevational view showing portions of the exposure control system of FIG. 1 in a different position;

FIG. 3 is a front elevational view showing portions of the exposure control system of FIG. 1 in still a different position;

FIG. 4 is a front elevational view showing portions of the exposure control system of FIG. 1 in still a different position;

FIG. 8 is a graphical representation showing the variation in the contribution to the film exposure between ambient scene light and the artificial light versus the variation in the ambient scene light intensity; and FIG. 9 is a graphical representation showing the variation in the follow focus aperture value at which the flash is fired versus the variation in ambient scene light intensity.

DESCRIPTION OF THE PREFERRED EMBODIMENTS

Figure 5:
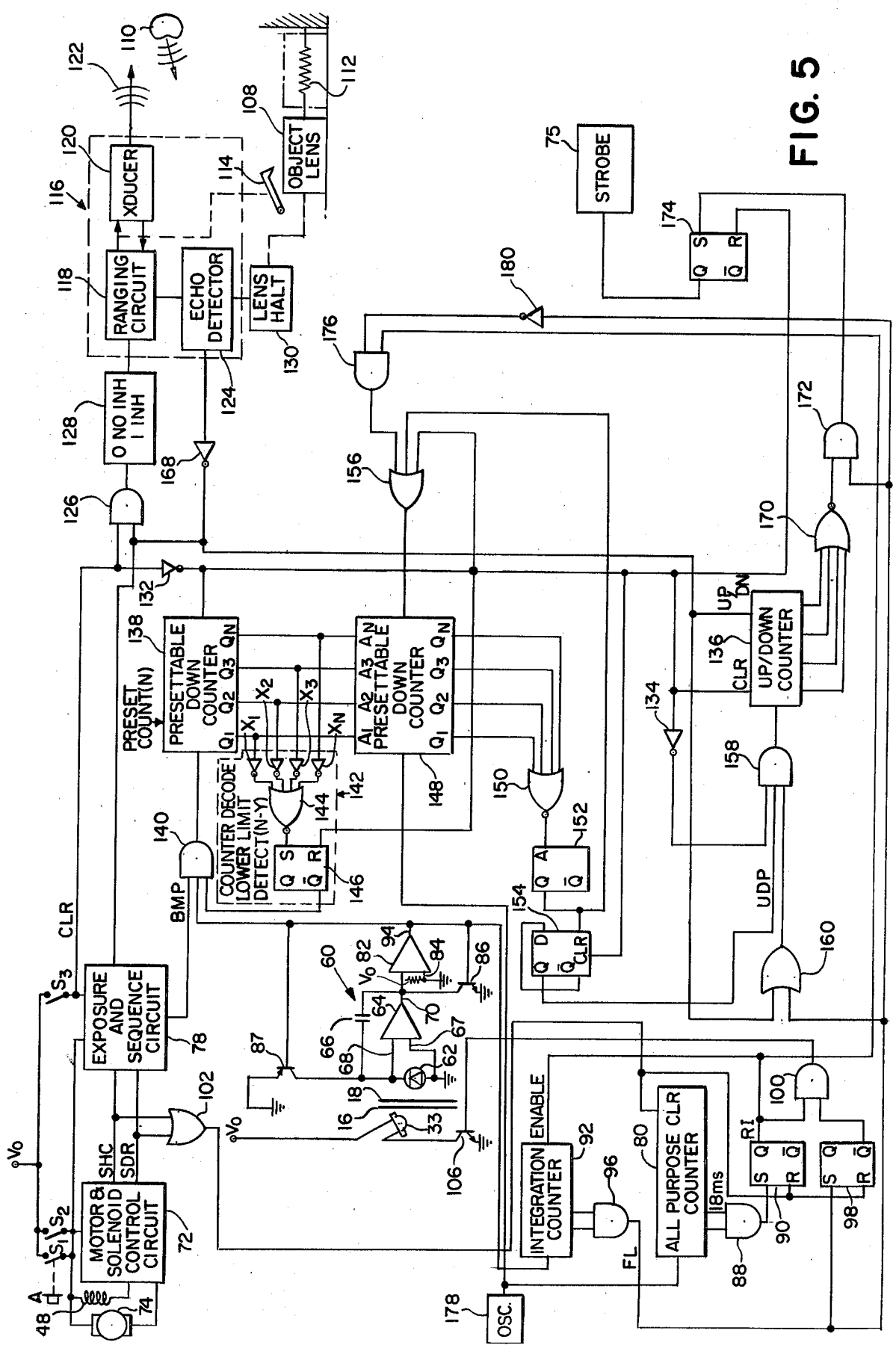
FIG. 5 is a schematic circuit diagram of the exposure and flash fire control system of this invention.

Referring now to FIGS. 1 through 4, there are shown generally at 10 a photographic exposure control shutter apparatus disposed about a baseblock casting 12 which can be selectively machined to support the various components of a photographic exposure control mechanism. Centrally disposed within the baseblock casting 12, there is provided a light entry exposure opening 14 which defines the maximum available exposure aperture for the system. An objective or taking lens arrangement or assembly as shown schematically in FIG. 5 at 108 is provided in overlying relation with respect to the light entry opening 14. Image carrying rays from the objective lens arrangement 108 which are transmitted by the shutter apparatus 10 in a manner to be subsequently described are thereafter directed to a rearwardly positioned film plane (not shown) by way of a reflecting mirror (also not shown) all of which are stationed within a suitable light-tight film exposure chamber (also not shown) in a manner as is more fully described in U.S. Pat. No. 4,040,072, entitled "Shutter Latch Arrangement Releasable Through Shutter Blade Actuation and Resettable Through Film Advancement", by Bruce K. Johnson et al., issued Aug. 2, 1977, in common assignment herewith and now incorporated by reference herein.

The exposure control shutter apparatus 10 comprises two overlapping shutter blade elements 16 and 18 of the so-called scanning type which will be subsequently described in greater detail herein. A pair of scene light admitting primary apertures 20 and 22 are provided, respectively, in the blade elements 16 and 18 to cooperatively define a progressive variation of effective aperture openings in accordance with simultaneous longitudinal and lateral displacement of one blade element with respect to the other blade element in a manner as is fully described in U.S. Pat. No. 3,942,183, entitled "Camera With Pivoting Blades", by George D. Whiteside, issued Mar. 2, 1977, in common assignment herewith and now incorporated by reference herein. The apertures 20 and 22 are selectively positioned so as to overlap the light entry exposure opening 14 thereby defining a gradually varying effective aperture size as a function of the position of the blade elements 16 and 18.

Each of the blades 16 and 18 is additionally configured to have corresponding photocell sweep secondary apertures shown, respectively, at 24 and 26. The photocell sweep secondary apertures 24 and 26 may be configured to track in a predetermined corresponding relationship with respect to the scene light admitting primary apertures 20 and 22. As is readily apparent, the photocell sweep secondary apertures 24 and 26 move in the same manner as the primary apertures 20 and 22 to define a small secondary effective aperture for admitting the passage of scene light transmitted to a photoresponsive element 62 (see FIG. 5) from the scene being photographed. The blades 16 and 18 also include, respectively, a third pair of first light detect apertures 30 and 32 which operate in a manner to be subsequently described to admit light from a source of artificial illumination such as an LED 33, as also shown in the circuit diagram of FIG. 5, to the photoresponsive element 62 in coincidence with the first light admitted to the film plane when the primary apertures 20 and 22 initially overlap at the commencement of an exposure interval. The shutter blade element 18 also includes a pre-exposure ambient scene light detect aperture 28 which is moved out of overlapping relationship with the edge of the shutter blade 16 to admit ambient light to the photoresponsive element 62 when the shutter blade elements 16 and 18 are moved to the position as shown in FIG. 2 in a manner as will be more fully described herein.

Projecting from the baseblock casting 12 at a location spaced laterally apart from the light entry exposure opening 14 is a pivot pin or stud 34 which pivotally and translatably engages elongate slots 36 and 38 formed in respective shutter blade elements 16 and 18. Pin 34 may be integrally formed with the baseblock casting 12 and blade elements 16 and 18 may be retained in engaging relation with respect to the pin 34 by any suitable means such as peening over the outside end of the pin 34.

The opposite ends of the blade elements 16 and 18 respectively include extended portions which pivotally connect to a walking beam 40. The walking beam 40, in turn, is disposed for rotation relative to the baseblock casting 12 by pivotal connection to a projecting pivot pin or stud 42 which may be integrally formed with the baseblock casting 12 at a location spaced laterally apart from the light entry exposure opening 14. The walking beam 40 may be pivotally retained with respect to the pin 42 by any conventional means such as an E ring (not shown). In the preferred mode, the walking beam 40 is pivotally connected at its distal ends to the shutter blade elements 16 and 18 by respective pin members 44 and 46 which extend laterally outward from the walking beam 40. Pin members 44 and 46 are preferably circular in cross section and extend through respective circular openings in respective shutter blade elements 16 and 18. Thus, the shutter blade elements 16 and 18 provide a blade mechanism with the means for mounting the blade mechanism for movement being provided by the walking beam 40 together with the pivot pin 34.

Drive means are provided for displacing the blade mechanism and include a tractive electromagnetic device in the form of a solenoid 48 employed to displace the shutter blades 16 and 18 with respect to each other and the baseblock casting 12. The solenoid 48 includes an internally disposed cylindrical plunger unit 50 which retracts inwardly into the body of the solenoid upon energization of the solenoid winding. The solenoid plunger 50 includes an end cap 52 at the outside end thereof together with a vertical slot or groove 54 within the end cap for loosely engaging a pin 56 extending outwardly from the walking beam 40. In this manner, the solenoid plunger 50 is affixed to the walking beam 40 so that longitudinal displacement of the plunger 50 will operate to rotate the walking beam about the pivot pin 40 so as to appropriately displace the shutter blades 16 and 18. The drive means may additionally include a helical compression spring 58 around the plunger 50 so as to continuously urge the end cap 52 outwardly of the solenoid 48, thereby also continuously urging the blade elements 16 and 18 into positions defining the largest effective primary aperture over the light entry exposure opening 14. As will be readily understood, in some shutter blade arrangements it may be preferable to utilize a tension spring in place of the compression spring 58 in a manner as is shown in U.S. Pat. No. 3,492,183, supra. Thus, with the spring connection herein described, the exposure control blade apparatus 10 is biased to continuously urge the shutter blade elements 16 and 18 into an open scene light unblocking orientation as shown in FIG. 4.

In the present arrangement, the shutter blades 16 and 18 are drawn from their scene light unblocking open arrangement as shown in FIG. 4 to their scene light blocking closed arrangement as shown in FIGS. 1 and 2 when the solenoid 48 is energized. Consequently, energization of the solenoid 48 prevents the shutter blades 16 and 18 from moving towards their maximum effective primary aperture defining arrangement under the urging of compression spring 58. However, it should be readily understood that the exposure control system of this invention would be equally applicable to photographic systems where the blades 16 and 18 are spring biased in a normally closed position. However, since in the preferred embodiment the shutter blade elements 16 and 18 are spring biased to move toward their scene light unblocking arrangement, it would otherwise be necessary to maintain the solenoid in a state of continued energization in order to hold the shutter blade elements 16 and 18 in their scene light blocking arrangement as shown in FIG. 1. Such continued energization of the solenoid 48, however, would present an intolerable power drain on the camera battery, particularly if the solenoid 48 had to be continuously energized even when the camera apparatus were not in use. In order to avoid this continued energization of the solenoid 46, there is provided a latch mechanism (not shown) which operates normally to latch the shutter blade mechanism in its scene light blocking arrangement as shown in FIG. 1 and which automatically unlatches the shutter blade mechanism to permit the shutter blade elements 16 and 18 to be moved to their scene light unblocking arrangement as shown in FIG. 4 in order to commence a photographic exposure cycle and which further automatically responds at the termination of an exposure cycle to relatch the blade elements 16 and 18 in their scene light blocking arrangement so as to permit deenergization of the solenoid 48. The manner in which the aforementioned latch operates is more fully described in U.S. Pat. No. 4,040,072, supra.

Referring now to FIG. 5, there is shown a schematic diagram for the preferred embodiment of an exposure control system embodying the features of this invention for operation in a manner now to be described. The objective lens arrangement or assembly, as shown in simplified fashion at 108, is disposed for movement between a plurality of different focal positions. During each film exposure operation, the objective lens assembly 108 is displaced to one of its focal positions for focusing at the focal plane, image forming light rays from a respective photographic subject as shown at 110 located within a given range of distances from the camera apparatus. As is readily apparent, the lens assembly 108 is adapted at each of its plurality of focal positions to focus at the focal plane of the camera, an image of a photographic subject located at a different distance from the camera within the given range of distances.

The lens assembly 108 is biased to move through its plurality of different focal positions by a tension spring 112 and may be held at an initial terminal position as shown in solid lines by a releasable latch 114. The spring 112 operates to bias the lens assembly 108 to move toward another terminal position as shown by the phantom lines. The lens assembly 108 while in its initial terminal position (solid lines), operates to focus image forming light rays from a photographic subject located at the closest possible distance to the camera within the aforementioned camera-to-subject distance range and while in its other terminal position (phantom lines) operates to focus image forming light rays from a photographic subject located at the furthest possible distance from the camera within the aforementioned camera-to-subject distance range. The movement of the lens assembly 108 from its initial terminal position towards its other terminal position operates to progressively focus image forming rays from corresponding subjects located at progressively increasing distances from the camera.

The photographic apparatus is also provided with a sonic rangefinder as shown generally at 116 and which is more fully disclosed in U.S. Pat. No. 4,199,246, entitled "Ultrasonic Ranging System For A Camera", by J. Muggli, issued Apr. 22, 1980 and U.S. Pat. No. 4,167,316, entitled "Sonar Controlled Lens Focus Apparatus", by Bruce K. Johnson et al., issued Sept. 11, 1979, in common assignment herewith and now incorporated by reference herein. The sonic rangefinder 116 includes a ranging circuit 118 which may be actuated in a manner to be herein described to issue a transmit commence signal to a sonic transducer 120 so as to cause the transmission of a sonar ranging signal comprising a burst of sonic energy as shown at 122. The transducer 120 thereafter operates to detect an echo signal reflected from the photographic subject 110 at an elapsed time interval subsequent to the transmission of the sonar ranging signal. An echo signal detector 124 then provides a signal indicative of this elapsed time period which corresponds directly to the distance between the camera and the subject 110 to be photographed. Thus, the sonic rangefinder 116 provides a range related time interval which corresponds directly to the distance between the camera and the subject to be photographed for reasons which will become more apparent in the following discussion.

As shown generally at 60 in FIG. 5, there is provided a scene light detecting and integrating circuit comprising a photoresponsive element 62 connected across the input terminals 67 and 68 of an operational amplifier 64 of the differential variety. When considered ideally, the amplifier 64 has an infinite gain and an infinite input impedance and a zero output impedance. The input circuit of the amplifier 64, however, is structured such that the apparent input impedance for the photoresponsive element 62 is substantially zero, thereby functioning in a manner which permits the photoresponsive element 62 to operate in a current mode. Consequently, the current generated by the photoresponsive element 62 is limited substantially only to its own internal impedance. To accomplish this effect, a feedback integration capacitor 66 is connected between one input terminal 68 of the operational amplifier 64 and an output terminal 70 from the operational amplifier 64.

With the integration feedback arrangement herein described, any difference of potential supplied by the photoresponsive element 62 across input terminals 67 and 68 will operate to cause a current of opposite polarity to be produced through feedback integration capacitor 66. As a consequence, the feedback integration capacitor 66 provides a substantially instantaneous feedback signal of opposite polarity which serves to counteract any differential signal voltage impressed by the photoresponsive element 62 across the input terminals 67 and 68. Thus, although the amplifier 64 has a very high input impedance, the photoresponsive element 62, when connected in the aforementioned manner, experiences only a very low input impedance to the amplifier 64. Therefore, the current output of the photoresponsive element 62 is directed into the feedback integration capacitor 66. In this manner, the photoresponsive element 62 is connected to operate in a constant current mode of operation under conditions of nonvarying scene light intensity to provide a substantially linear output response at an output terminal 70 as more fully described in U.S. Pat. No. 3,620,143 entitled "Automatic Exposure Control System With Fast Linear Response", by John P. Burgarella, issued Nov. 16, 1971, in common assignment herewith and now incorporated by reference herein in its entirety.

Figure 6:
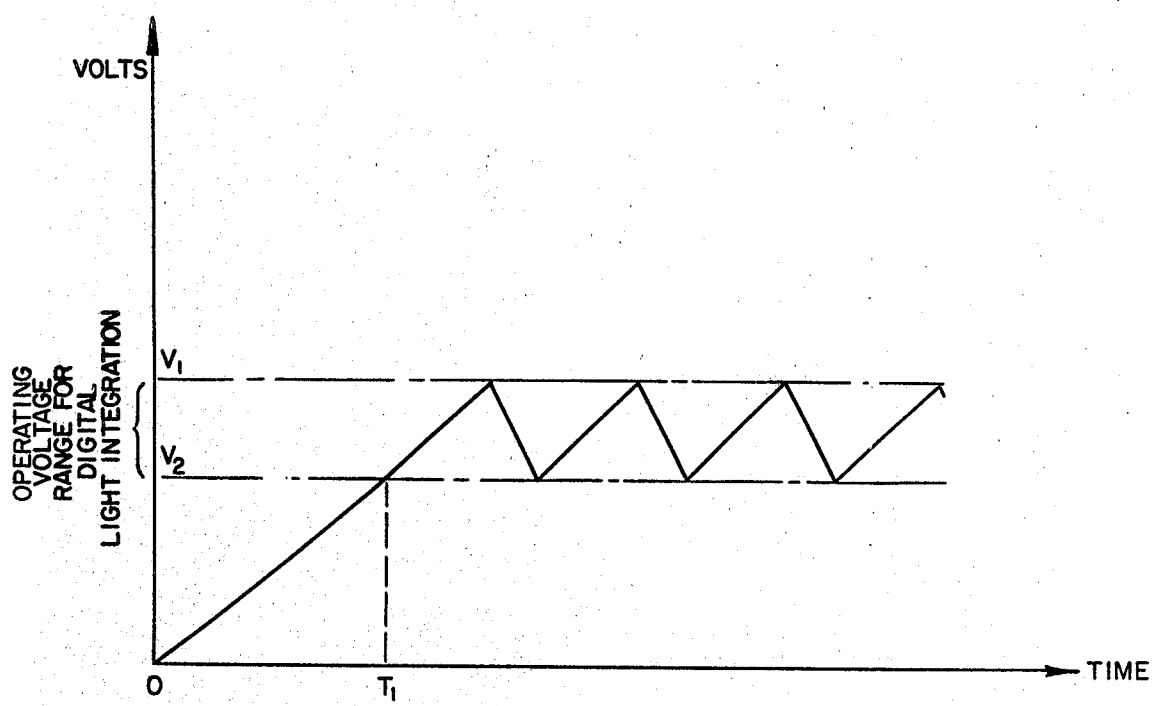
FIG. 6 is a graphical representation showing the output from the scene light integrating circuit of FIG. 5.
Figure 7:
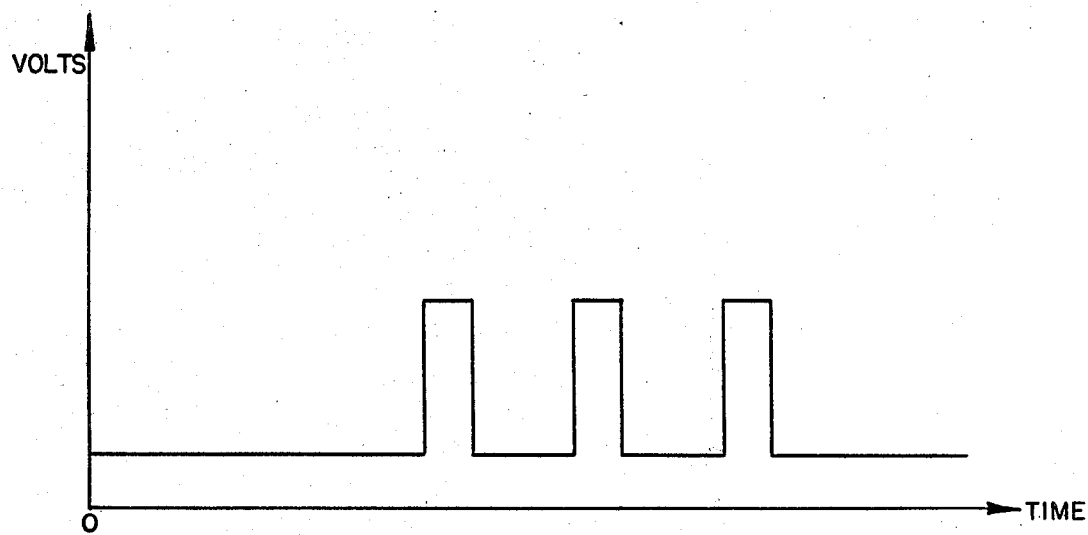
FIG. 7 is a graphical representation showing a digital pulse train output signal from a comparator controlled by the output signal from the light integrator of FIG. 5.

The scene light integrating circuit 60 responds to light incident to the photoresponsive element 62 to provide an integrated output response as shown in FIG. 6. The integrated output response along output line 70 is directed to an input terminal of a comparator 82 which operates to compare the integrated output voltage signal along line 70 with a select reference voltage signal level $V_1$ as derived from an input line 84. When the output voltage signal level from the integrating circuit 60 along line 70 reaches the selected reference signal level $V_1$ along line 84, the comparator 82 switches from a low (binary logic 0) output signal level to an assertive (binary logic 1) output signal level along output line 94 to drive an NPN transistor 86 into saturation and thereby discharge the feedback integration capacitor 66. Additionally, a PNP transistor 87 connected in reverse operating mode is simultaneously turned on to divert current from the photoresponsive element 62. The output signal level from the integrating circuit 60 discharges to a selected voltage value $V_2$ below the selected reference level $V_1$ as shown in FIG. 6 whereupon the comparator 82 switches back to provide a low (binary logic 0) output signal level to turn off the transistor 86 and allow the integration circuit 60 to resume integrating back to the select reference voltage signal level $V_1$. The comparator 82 and light integrating circuit 60 continue to cycle in the aforementioned manner between the selected reference voltage $V_1$ and the selected value below the reference voltage $V_2$ as a result of the hysteresis associated with the comparator 82 to provide a saw tooth output signal along line 70 as shown in FIG. 6. The output signal from the comparator 82 at line 94 approximates a digital pulse train as shown in FIG. 7 whereupon the pulses may be subsequently counted in the manner of this invention as will be subsequently described.

The exposure control circuitry herein described preferably derives power from a battery that is insertable within the camera in correspondence with a film pack or cassette in a manner that is well known in the art for Polaroid SX-70 type film cassettes and cameras. The aforementioned film cassette battery is preferably utilized to power the circuitry in FIG. 5 in its entirety by way of three switches $S_1$, $S_2$, and $S_3$ in a manner as is more fully described in U.S. Pat. No. 4,040,072, supra. The exposure control circuitry of FIG. 5 also includes a motor and solenoid control circuit 72 which operates in a manner as is more fully described in U.S. Pat. No. 4,040,072, supra. As is readily apparent, the motor and solenoid control circuit 72 operates to control the energizing current delivered to the solenoid 48 and to a motor 74. The film units intended for use with the camera of this invention are preferably of the self-developing type, and the motor 74 is provided to effect the advancement and processing of the self-developing film units in a well-known manner.

The photographic apparatus may also include an electronic flash or strobe 75 which is powered and fired in the manner of this invention to be subsequently described herein.

The digital pulse train output at line 94 is directed to an integration counter 92 and to a presettable down counter 138 by way of an AND gate 140. The integration counter 92 is enabled to count the individual pulses in the digital pulse train output at line 94 starting at a select time during the exposure cycle by an all purpose counter 80 in a manner to be more fully described in the following discussion. The output from the presettable down counter 138, in turn, is decoded by a lower limit detect circuit as shown at 142 which determines the lower limit to which the counter 138 is permitted to count down. The binary output down count at terminals $Q_1$ through $Q_n$ of counter 138 are also directed to input another presettable down counter 148, the binary output count from which at terminals $Q_1$ through $Q_n$ is thereafter decoded by way of a NOR gate 150, a monostable multivibrator 152 and a flip-flop 154 in a manner to be subsequently described. The decoded output from the counter 148 is thereafter inputted to an up/down counter 136 by way of an AND gate 158 in a manner also to be more fully described. The output from the up/down counter 136 is thereafter decoded by way of a NOR gate 170 which, in turn, inputs an AND gate 172, the output from which sets a flip-flop 174 to provide a flash fire signal to the strobe 75 in the manner of this invention to be subsequently described.

When the strobe 75 has been fully charged in a well-known manner, the photographer may initiate a photographic exposure cycle by manually actuating a button A so as to close the switch $S_1$ in a manner as is more fully described in U.S. Pat. No. 4,040,072, supra. Closure of the switch $S_1$, in turn, signals an exposure and sequencing circuit 78 in a manner as is fully disclosed in U.S. Pat. No. 4,192,587, entitled "Proportional Fill Flash", by Arthur G. LaRocque et al., issued Mar. 11, 1980, in common assignment herewith and now incorporated by reference herein, to provide a high (binary logic 1) solenoid drive signal along output line SDR to the motor and solenoid control circuit 72 so as to energize the solenoid 48 and retract the plunger 50 inwardly to rotate the walking beam 40 in a counterclockwise direction from its position as shown in FIG. 1 to its position as shown in FIG. 2. This limited counterclockwise movement of the walking beam 40 operates to effect the release of the previously mentioned latch mechanism (not shown) while simultaneously effecting the closure of the switches $S_2$ and $S_3$ in a manner as is again more fully described in U.S. Pat. No. 4,040,072, supra. Immediately prior to the closure of the switch $S_3$, as is readily apparent, there is provided a low (binary logic 0) signal level along line CLR which signal level is subsequently inverted by an inverter gate 132 to provide a high (binary logic 1) signal level to preset the counter 138 by loading the select binary count therein while at the same time clearing and resetting the flip-flops 146, 154, and the up/down counter 136. In this manner, the up/down counter 136 is cleared with all the output signals therefrom going to low (binary logic 0) output signal levels. The output signals from the Q terminals of the flip-flops 146 and 154 also simultaneously go to low (binary logic 0) levels while the output signals from the $\overline{Q}$ terminals thereof go to high (binary logic 1) levels.

Closure of the switch $S_3$ also operates to signal the exposure and sequencing circuit 78 to provide a logic signal by way of the interconnecting line SHC to the motor and solenoid control circuit 72 to power the solenoid 48 from its initial high current energization condition required to retract the plunger 50 to a low current energization condition required to temporarily hold the plunger in its retracted position as shown in FIG. 2. The powering down of the solenoid 48 to a holding current mode is accomplished in a manner as is fully described in U.S. Pat. No. 4,192,586, supra, and does not effect the assertive (binary logic 1) output signal level provided from the exposure and sequencing circuit 78 along the output line SDR. Closure of the switch $S_3$ in the aforementioned manner also operates to provide a high (binary logic 1) output signal level to one input terminal of an AND gate 126, in turn, switching the output therefrom to a high (binary logic 1) signal level to input a sonar inhibit circuit 128 so as to remove the inhibit imposed on the sonar rangefinding circuit 116 and allow the sonar rangefinding circuit to issue a transmit commence signal to the sonic transducer 120.

As previously discussed, the presettable down counter 138 is preset with a select binary count indicative of a binary number N which is displayed by the various binary signal levels on the output terminals $Q_1$ through $Q_n$ thereof. The presettable down counter 148 is also preset simultaneously with the counter 138 by way of a high (binary logic 1) output signal level received from an OR gate 156, one input terminal to which receives a high (binary logic 1) output signal level from the inverter 132. Presetting the counter 148 in this manner operates to input the binary count N from the output terminals $Q_1$ through $Q_n$ of counter 138 into the corresponding input terminals $A_1$ through $A_n$ of the counter 148. The counter 138 at the commencement of the exposure cycle is initially inhibited from counting down from its preset binary count N by the exposure and sequence circuit 78 which provides a low (binary logic 0) signal level along line BMP to disable the AND gate 140 from gating the digital pulse train from line 94 into the counter 138.

Thus, immediately subsequent to the closure of switch $S_3$ the presettable down counter 148 is enabled by the output signal from the OR gate 156 switching to a low (binary logic 0) output signal level to start counting down from its preset binary count N at a rate determined by the frequency F of a clock pulse train derived from a clock 178. Upon counting down from its initial preset binary count N to a binary count of zero, the counter 148 provides low (binary logic 0) output signal levels from all of its output terminals $Q_1$ through $Q_n$ thereby switching the NOR gate 150 to provide a high (binary logic 1) output signal level to the monostable multivibrator 152 (one shot) so as to switch the output at the Q terminal thereof to a high (binary logic 1) signal level for a limited time period as is well known. The high (binary logic 1) output signal level from the one shot 152, in turn, switches the flip-flop 154 so as to provide a high (binary logic 1) output signal level from the Q terminal thereof and a low (binary logic 0) output signal level from the $\overline{Q}$ terminal thereof. The (binary logic 1) output signal level from the Q terminal of one shot 152 is also simultaneously directed to one input terminal of the OR gate 156 thereby switching the output signal therefrom back to a high (binary logic 1) level so as to reset the counter 148 and again input the binary count N from the output terminals $Q_1$ through $Q_n$ of the counter 138 into the corresponding input terminals $A_1$ through $A_n$ of the counter 148.

The high (binary logic 1) output signal level from the Q terminal of the one shot 152 thereafter switches to a low (binary logic 0) signal level so as to switch the OR gate 156 to provide a low (binary logic 0) signal level to the counter 148 to enable the counter 148 to again count down from the reset binary count N at a rate again determined by the frequency of the input clock pulse train received from the clock 178. Upon again reaching the zero binary count, the counter 148 again provides low (binary logic 0) output signal levels at all of its output terminals $Q_1$ through $Q_4$ to switch the NOR gate 150 and provide a high (binary logic 1) input signal level to again gate the one shot 152. The high (binary logic 1) output signal from the Q terminal of the one shot 152 triggers the flip-flop 154 to provide a low (binary logic 0) output signal level from the Q terminal thereof and a high (binary logic 1) output signal level from the $\overline{Q}$ terminal thereof. The counter is again reset in the aforementioned manner to receive the binary count N output signal from the counter 138 and to again count down to a zero binary count at a rate determined by the frequency of the clock pulse train provided by the clock 178. As is now readily apparent, there is provided a digital pulse train output signal at the Q terminal of the flip-flop 154 along line UDP (up/down pulse train) having a frequency equal to the frequency of the clock pulse train from the clock 178 divided by two times the binary count N.

The digital pulse train along line UDP is thereafter gated by the AND gate 158 to the up/down counter 136. The up/down counter 136 prior to receipt of an echo signal from the photographic subject 110 by the rangefinder circuit 116 is signalled to operate in an up count mode of operation by the output signal level received from the echo detector 124 which is inverted by an inverter gate 168 to provide a high (binary logic 1) input signal level to the mode select terminal of the counter 136. The high (binary logic 1) signal level from the inverter 168 is also simultaneously directed to one input terminal of an OR gate 160 so as to switch the output therefrom to a high (binary logic 1) signal level which is directed to one input terminal of the AND gate 158. The high (binary logic 1) signal level along the line CLR existing subsequent to the closure of the switch $S_3$ and inverted by the inverter gate 132 is thereafter again inverted by an inverter gate 134 to provide a high (binary logic 1) input signal level to another input terminal of the digital AND gate 158. Thus, the AND gate 158 is enabled to gate the pulse train from line UDP to the up/down counter 136 which thereafter proceeds to count up at a rate determined by the frequency of the digital pulse train along line UDP which as previously discussed is equal to the frequency of the clock pulse 178 divided by two times the select binary count N.

Receipt of the echo signal from the photographic subject 110 by the transducer 120 signals the echo detector 124 to provide a high (binary logic 1) output signal level which is subsequently inverted by the inverter gate 168 to provide a low (binary logic 0) output signal level to an input terminal of the AND gate 126 thereby switching the inhibit circuit 128 to provide a sonar ranging inhibit signal. The low (binary logic 0) signal level from the inverter 168 is also simultaneously directed by way of the OR gate 160 to one input terminal of the AND gate 158 to disable the AND gate 158 from further gating the digital pulse train from line UDP to the up/down counter 136. The low (binary logic 0) output signal level from the inverter gate 168 also simultaneously operates to change the counter 136 from an up mode of counting to a down mode of counting. Thus, as is now readily apparent, closure of the switch $S_3$ operates to synchronize the transmission of the sonar ranging signal with the initiation of the presettable down counter 148 counting down from the preset select binary count N so as to simultaneously initiate the counter 136 to count up the digital pulse train received along line UDP whose frequency equals the frequency of the clock pulse received from the clock 178 divided by two times the binary count N. Subsequent receipt of the echo from the subject 110 operates to simultaneously terminate the up count by the counter 136 so that the total binary count inputted to the counter 136 corresponds directly to the time between transmission of the sonar ranging signal and receipt of the echo which, in turn, corresponds directly to the camera-to-subject distance range and thus defines the range related time interval. In addition, it will be readily understood that receipt of the echo signal by the echo detector 124 provides an assertive signal to a lens halt system as shown generally at 130 which stops the movement of the objective lens 108 at the appropriate focal position in a manner as is more fully described in U.S. patent application Ser. No. 156,044, now U.S. Pat. No. 4,307,952, entitled "Digital Lens Disc Pawl Release Arrangement", filed in common assignment herewith and now incorporated by reference herein. Under conditions where the photographic subject 110 is located at infinity and no echo signal is received by the transducer 120, the counter 136 fills and thereafter terminates the up count mode of operation in a manner as is fully described in U.S. Pat. No. 4,192,587, supra.

Subsequent to receipt of the echo signal by the rangefinder 116 or the filling of the counter 136 in the previously discussed manner, the exposure and sequence circuit 78 operates to provide low (binary logic 0) output signals along lines SHC and SDR to signal the motor and solenoid control circuit 72 to deenergize the solenoid 48 and release the shutter blade elements 16 and 18 to move toward the position as shown in FIG. 3 so as to ultimately commence an exposure interval. As is readily apparent, prior to the deenergization of the solenoid 48 and subsequent to the closure of the switch $S_3$, either line SHC or SDR provided a high (binary logic 1) signal level to an OR gate 102 which, in turn, provided a high (binary logic 1) output signal level to clear the all purpose counter 80 and to reset a pair of flip-flops 90 and 98 such that the Q output terminals thereof provide high (binary logic 1) output signal levels and the $\overline{Q}$ terminals thereof provide low (binary logic 0) output signal levels therefrom. The solenoid 48 is deenergized and the shutter blade elements 16 and 18 are released for opening movement when the signal levels along lines SHC and SDR are switched by the exposure and sequence circuit 78 to low (binary logic 0) levels which levels, in turn, operate to switch the OR gate 102 to provide a low (binary logic 0) output signal level to enable the all purpose counter 80 to begin counting the clock pulse received from the clock 178. In this manner, the all purpose counter 80 is synchronized to start counting generally in correspondence with the initial movement of the shutter blade elements 16 and 18 from the position as shown in FIG. 2 toward the positions as shown in FIGS. 3 and 4.

The exposure and sequence circuit 78 in synchronism with the deenergization of the solenoid 48 operates to provide a pre-exposure ambient scene light brightness measurement pulse of predetermined limited duration along line BMP to the AND gate 140 thereby enabling the AND gate 140 to transmit the digital pulse train from line 94 to the presettable down counter 138. Whereas the pre-exposure ambient scene light detect aperture 28 overlaps the edge of the shutter blade 16 when the shutter blade mechanism is in the position as shown in FIG. 2, ambient scene light is admitted to the photoresponsive element 62 and the scene light detecting and integrating circuit 60 operates in the aforementioned manner to provide an output digital pulse train at line 94 which is gated to the presettable down counter 138 for the duration of the brightness measurement pulse provided by the exposure and sequence circuit 78 along line BMP. Since the shutter blade elements 16 and 18 are released for movement in synchronism with the leading edge of the brightness measurement pulse, it will be understood that the brightness measurement pulse will generally correspond to the time required for the pre-exposure ambient and scene light detect aperture 28 to be moved back into overlapping relationship with the shutter blade 16 thereby blocking ambient scene light from reaching the photocell 62.

As is now readily apparent, the frequency of the digital pulse train received from the scene light detecting and integrating circuit 60 and comparator 82 along output line 94 corresponds directly to the intensity of the light incident to the photoresponsive element 62, and thus the rate at which the presettable down counter 138 counts down from its preset binary count N during the brightness measurement pulse corresponds directly to the intensity of light incident to the photoresponsive element 62. Under conditions of relatively low ambient scene light intensity where, for example, the ambient scene light intensity is equal to or less than a select level such as B c/ft.$^2$ as shown graphically in FIGS. 8 and 9, the period of the digital pulse train at line 94 is long and generally equal to or greater than the period of the brightness measurement pulse so that the presettable counter 138 counts down substantially no pulses from the preset binary count N during the pre-exposure ambient scene light brightness measurement period. The relatively low level B of ambient scene light intensity is preferably selected to correspond to the maximum level of ambient scene light intensity which will have a negligible film exposure influence during the maximum exposure interval allowable without incurring adverse blurring effects from the normally expected hand motion of the photographer for a selected film speed and exposure aperture size.

Under conditions of relatively high ambient scene light intensity where, for example, the ambient scene light intensity is equal to or greater than a select level such as A c/ft.$^2$ as shown graphically in FIGS. 8 and 9, the scene light integration will occur rapidly and the frequency of the digital pulse train along line 94 will increase so as to effect a corresponding increase in the rate at which the presettable down counter 138 counts down from the preset binary count N during the ambient scene light brightness measurement pulse. The relatively high level A of ambient scene light intensity is preferably selected to correspond to the minimum level of ambient scene light intensity which by itself will still provide for a generally adequate film exposure during the maximum exposure interval allowable without incurring the adverse blurring effects from the normally expected hand motion of the photographer for a select film and exposure aperture. Under the aforementioned conditions of relatively high ambient scene light intensity, equal to or greater than A c/ft.$^2$, the presettable down counter 138 will count down from the preset binary count N during the pre-exposure ambient brightness measurement pulse at a sufficient rate to reach a selected minimum down count (N-Y) as decoded by the counter decode circuit 142. The counter decode circuit 142 comprises a plurality of inverter gates $X_1$ through $X_n$ which switch to provide high (binary logic 1) input signal levels to a NOR gate 144 upon the signal levels at output terminals $Q_1$ through $Q_n$ of counter 138 reaching the selected minimum count of N-Y. In response to all the outputs from the inverters $X_1$ through $X_n$ switching to positive (binary logic 1) signal levels, the NOR gate 144 switches to provide a positive (binary logic 1) output signal level to set a flip-flop 146 thereby, in turn, switching the output from the $\overline{Q}$ terminal thereof from a high (binary logic 1) signal level to a low (binary logic 0) input signal level to the AND gate 140 so as to disable the AND gate 140 from further gating the digital pulse train from line 94 to the counter 138. As is now readily apparent, if the ambient scene light intensity is within a range of select levels between A c/ft.$^2$ and B c/ft.$^2$, the presettable down counter 138 will count down during the pre-exposure ambient brightness measurement pulse to provide a binary down count output signal along its output terminals $Q_1$ through $Q_n$ between the preset binary count N and a selected minimum binary count N-Y.

Approximately 18 milliseconds subsequent to the deenergization of the solenoid 48 and initiation of the brightness measurement pulse along line BMP, a decode signal is provided from the all purpose counter 80 by an AND gate 88 which switches to provide a high (binary logic 1) output signal level to set the flip-flop 90. The flip-flop 90, in turn, switches to provide a high (binary logic 1) output signal level from its Q terminal to enable the integration counter 92 to start counting and at the same time to provide a high (binary logic 1) output signal level to one input terminal of an AND gate 176 and an AND gate 100, respectively. The other input terminal to the AND gate 100 is already at a high (binary logic 1) input signal level by virtue of the output received from the $\overline{Q}$ terminal of flip-flop 98. Thus, the AND gate 100 switches to provide a high (binary logic 1) base drive output signal level to drive a transistor 106 into saturation and energize the LED 33. In this manner, the LED 33 is energized immediately prior to the shutter blade elements 16 and 18 reaching the position as shown in FIG. 3 where the exposure interval commences and the scene light is first admitted to the film plane. As is readily apparent, the primary apertures 20 and 22 just begin to overlap to admit scene light to the film plane at about the same time that the photocell sweep secondary apertures 24 and 26 begin to overlap to admit scene light to the photoresponsive element 62.

The first light detect apertures 30 and 32 also begin to overlap to admit artificial light from the LED 33 to the photoresponsive element 62 in synchronism with the first scene light admitted by the primary apertures 20 and 22 to the film plane. The light detecting and integrating circuit 60 detects and integrates the artificial light from the LED to provide the saw tooth output signal along line 70 as shown in FIG. 6 to the comparator 82. The comparator 82, in turn, provides the output pulse train as shown in FIG. 7 to the integration counter 92 which is enabled to count up by virtue of the high (binary logic 1) output signal level received from the Q terminal of flip-flop 90. The integration counter 92 is subsequently decoded upon reaching a preselected pulse count by an AND gate 96 which is switched to provide a high (binary logic 1) output signal to the set terminal of flip-flop 98. The output signal level at terminal $\overline{Q}$ from flip-flop 98 is thereby switched to a low (binary logic 0) signal level to switch the AND gate 100 to provide a low (binary logic 0) output signal level, in turn, turning off the transistor 106 and deenergizing LED 33. The shutter blade elements continue to move toward the maximum aperture defining position as shown in FIG. 4.

The decode of the integration counter 92 by the AND gate 96 to provide a high (binary logic 1) output signal level along line FL signals the commencement of the exposure interval. The high (binary logic 1) output signal level along line FL is subsequently inverted by an inverter gate 180 and thereafter directed to one input terminal of the AND gate 176, the other input terminal to which is already at a high (binary logic 1) input signal level by virtue of the high (binary logic 1) output signal level received from the Q terminal of flip-flop 90. Thus, the initial setting of the flip-flop 90 by the 18 millisecond decode from the all purpose counter 80 operates to switch the AND gate 176 to provide a high (binary logic 1) input signal level to the OR gate 156 which, in turn, switches to reset the presettable down counter 148 to receive at its input terminals $A_1$ through $A_n$, the binary down count existent at the output terminals $Q_1$ through $Q_n$ of the counter 138 as determined during the previously described pre-exposure ambient scene light brightness measurement.

The positive (binary logic 1) signal level along line FL provided by the decode of integration counter 92 at the initiation of the exposure interval and thereafter inverted by the gate 180 to a low (binary logic 0) signal level subsequently operates to switch the AND gate 176 to provide a low (binary logic 0) input signal level to the OR gate 156 which, in turn, switches to provide a low (binary logic 0) signal level to enable the counter 148 to start counting down again at a rate determined by the frequency of the clock pulse from the clock 178. In this manner, the counter 148 is enabled to start counting down from the binary down count derived from the counter 138 in synchronism with the commencement of the exposure cycle when the shutter blade elements 16 and 18 move into position where the primary apertures 20 and 22 just begin to overlap to admit scene light to the film plane.

The presettable counter continues to count down to zero in the aforementioned manner and is thereafter decoded by the NOR gate 150 to trigger the one shot 152 and reset the flip-flop 154 to provide the digital pulse train along line UDP to the AND gate 158 in the manner as previously discussed. The frequency of the pulse train along line UDP equals the frequency of the clock pulse from the clock 178 divided by two times the binary down count at the output terminals $Q_1$ through $Q_n$ of the counter 138 subsequent to its counting down during the brightness measurement pulse. Thus, the frequency of the digital pulse train along line UDP corresponds to the intensity of the ambient scene light measured prior to exposure during the brightness measurement pulse and decreases with increasing ambient scene light intensity.

The high (binary logic 1) signal level along line FL as derived from the output of AND gate 96 upon the decode of the integration counter 92 at the commencement of the exposure interval operates to switch the OR gate 160 to provide a high (binary logic 1) input signal level to the AND gate 158 thereby enabling the AND gate 158 to gate the pulse train on line UDP to the up/down counter 136. The counter 136 thereafter proceeds to count down from its previously registered up count until reaching a zero binary count which is decoded by the NOR gate 170 to provide a high (binary logic 1) output signal level to the AND gate 172. The counter 136 thus counts down at a rate determined by the frequency of the pulse train along UDP which as previously discussed corresponds directly to the intensity of the ambient scene light measured prior to the actual film exposure. The high (binary logic 1) output signal level from the NOR gate 170 operates to switch the AND gate 172 to provide a high (binary logic 1) input signal level to set the flip-flop 174 and switch the output at the Q terminal thereof to a high (binary logic 1) flash fire trigger signal to the strobe 75 thereby firing its associated flash in a well-known manner.

Thus, the counter 136 by counting down the pulse train received from line UDP provides a range responsive time signal commencing in correspondence with the initiation of the exposure interval and terminating at the lapse of a time period corresponding to the range related time interval and thus the distance between the camera and the subject to be photographed. During the time in which the counter 136 counts down, the shutter blade elements 16 and 18 are driven from their position as shown in FIG. 3 toward their position as shown in FIG. 4 to define progressively increasing effective primary aperture values until reaching the maximum aperture defining position as shown in FIG. 4. Since the total number of pulses previously counted up by the counter 136 during the previously mentioned rangefinding operation corresponds directly to the camera-to-subject range, the number of pulses counted down by the counter 136 also corresponds to the camera-to-subject distance range and progressively increases in correspondence with increasing camera-to-subject range thereby progressively increasing the time subsequent to the initiation exposure interval at which the flash is fired so as to fire the flash at the appropriate follow focus aperture corresponding to the camera-to-subject distance in a well-known manner as is more fully described in U.S. Pat. No. 4,188,103, entitled "Sonar Controlled Flash", issued in common assignment herewith and now incorporated by reference herein.

Under the previously mentioned conditions of relatively low ambient scene light intensity where the ambient scene light intensity is equal to or less than B $c/ft.^2$ and of insufficient intensity to have even a negligible film exposure influencing effect during the previously mentioned maximum exposure interval, the presettable counter 138 counts down a negligible number of counts during the pre-exposure ambient scene light measurement, and thus the counter 148 is inputted with the binary down count N at the commencement of the exposure interval and the frequency of the digital pulse train provided along the line UDP is equal to the frequency of the clock pulse from the clock 178 divided by two times the binary count N. This provides the slowest rate at which the counter 136 can be counted down to ensure that the flash is fired at the largest appropriate follow focus aperture as shown in FIG. 9 where the film exposure is due virtually entirely to the artificial light provided by the strobe 75.

Under conditions of relatively high ambient scene light intensity above A $c/ft.^2$ where the ambient scene light intensity is equal to or greater than the minimum level of ambient scene light intensity which by itself will still provide for a generally adequate film exposure during the maximum exposure interval allowable, the presettable down counter 138 counts down to a minimum allowable count N-Y during the pre-exposure ambient scene light measurement. The counter 148 is thus set at the minimal binary down count N-Y immediately prior to the commencement of the exposure interval to provide the highest frequency digital pulse train along the line UDP equal to the frequency of the clock pulse 178 divided by two times the binary count N-Y. Thus, the counter 136 counts down immediately subsequent to the initiation of the exposure interval at the fastest rate possible to provide the flash fire signal at the smallest follow focus aperture as shown in FIG. 9. The difference between the largest and smallest follow focus apertures at which the electronic flash may be fired may be in the order of 2 stops for the same camera-to-subject distance range.

For ambient scene light intensities between A and B $c/ft.^2$, it can be seen that the counter 138 will count down from the maximum preset binary count N to some binary count output greater than N-Y and thereby preset the counter 148 with a binary down count less than N but greater than N-Y. Thus, the frequency of the digital pulse train along line UDP will be at some intermediate value equal to the frequency of the clock pulse 176 divided by two times the preset binary count N minus the actual number of clock pulses counted down by the counter 138 during the brightness measurement pulse. The up/down counter 136 subsequent to the initiation of the exposure interval counts down at an intermediate rate determined by the frequency of the digital pulse train along line UDP. The lapsed time period at which the flash is fired is thus progressively varied in inverse corresponding relation to the progressive variation in the ambient scene light detected prior to exposure to effect a progressive reduction in the size of the follow focus aperture at which the flash is fired in correspondence with increasing ambient scene light intensity between A $c/ft.^2$ and B $c/ft.^2$ for a determinate subject distance as shown in FIG. 9. Although the appropriate follow focus aperture at which the flash is fired is varied in a linear fashion between the ambient scene light intensities A and B $c/ft.^2$, the invention is by no means limited to this linear relationship and the counters 138 and 148 may be programmed to provide a nonlinear changing flash fire follow focus aperture as is well known in the art.

Referring now to FIG. 8, it can be seen that the gradual reduction in the size of the follow focus aperture at which the flash is fired as the ambient scene light intensity increases from B $c/ft.^2$ to A $c/ft.^2$ results in a dramatic increase in the contribution of the ambient scene light to the overall exposure and in a dramatic decrease in the contribution of the artificial light from the strobe to the overall exposure within this range. For ambient scene light intensities above A $c/ft.^2$, the follow focus aperture at which the flash is fired is determined primarily as a function of camera-to-subject range and the camera operates in a proportional fill flash mode as shown in U.S. Pat. No. 4,192,587, supra, where the exposure may be attributable to a select percentage of ambient and artificial strobe light.

Other embodiments of the invention, including additions, subtractions, deletions and other modifications of the preferred disclosed embodiments of the invention will be obvious to those skilled in the art and are within the scope of the claims.

What is claimed is:

1. In a photographic exposure control system for use with a source of artificial illumination and for controlling the exposure of a photosensitive recording medium, said system having a shutter arrangement for at least initially providing progressively increasing aperture values at a predetermined rate during an exposure interval within which scene light is transmitted to the photosensitive medium following actuation of said shutter arrangement, means for providing a flash fire signal to ignite the source of artificial illumination during the exposure interval, and means for determining the distance of a photographic subject from said system to define a range related time interval corresponding to the subject distance and for producing said flash fire signal responsive to a lapse of a time period commencing at the initiation of the exposure interval and corresponding to said range related time interval to thereby produce said flash fire signal at an aperture value corresponding to the subject distance, the improvement comprising means for detecting ambient scene light prior to exposure, and means responsive to the pre-exposure detection of ambient scene light intensity above a first select level and below a second select level greater than said first select level for progressively varying said lapsed time period at which said flash fire signal is provided in inverse corresponding relation to the progressive variation of said detected ambient scene light between said first and second levels for a determined subject distance.

2. The improvement of claim 1 wherein said means for progressively varying said lapsed time period at which said flash fire signal is provided further responds to the pre-exposure detection of ambient scene light intensity below said first select level to provide a maximum lapsed time period before said flash fire signal and to the pre-exposure detection of ambient scene light intensity above said second select level to provide a minimum lapsed time period before said flash fire signal for the same determined subject distance.

3. The improvement of claim 1 or 2 wherein said means for producing said flash fire signal at the lapse of said time period includes counter means for counting up during said range related time interval corresponding to the subject distance and for counting back down starting at the commencement of said exposure interval to define said lapsed time period and said means for progressively varying said lapsed time period includes means for progressively varying the rate at which said counter means counts back down.

4. The improvement of claim 3 wherein said means for progressively varying said lapsed time period further includes means for providing a digital pulse train output signal having a frequency corresponding to the intensity of pre-exposure ambient scene light so detected, a first counter preset at a select count to count down the number of pulses in said digital pulse train for a limited pre-exposure measurement period and to provide an output signal representative of said down count, a second counter preset at said down count from said first counter and enabled to count down at a rate determined by a select clock pulse; and means for decoding said second counter upon said second counter counting down to a select count and thereafter resetting said second counter again to again count down from said preset down count to provide another digital pulse train to control the rate at which said counter means counts up and down, the frequency of said other digital pulse train being a function of the frequency of said clock pulse and said down count from said first counter such that a progressive increase in the intensity of ambient scene light detected prior to exposure results in a progressive increase in the number of pulses counted down by said first counter, a progressive decrease in the time required for said second counter to count down and recycle from its said down count, a progressive increase in the frequency of said other pulse train which controls the rate at which said counter means counts down and hence a progressive decrease in the aperture value at which said flash fire signal is provided.

5. The improvement of claim 4 wherein said counter means initially counts up during the range related time interval corresponding to the subject distance at a rate responsive to the frequency of said clock pulse and said select count at which said first counter is preset.

6. The improvement of claim 4 wherein there is further included means for decoding said first counter upon said first counter counting down to a second select minimum count from its said preset select count and thereafter inhibiting said first counter from further counting down from said second select minimum count and wherein upon the pre-exposure detection of ambient scene light intensity below said first select level, said scene light detecting means provides a digital pulse train output signal of sufficiently low frequency to cause said first counter to count down substantially no pulses from its said preset select count during said limited pre-exposure measurement period such that the frequency of said other digital pulse train which controls the rate at which said up/down counter means counts down is minimized at a value equal to the clock pulse frequency divided by two times said preset select count to said first counter, and wherein upon the pre-exposure detection of ambient scene light intensity above said second select level, said scene light detecting means provides a digital pulse train output signal of sufficiently high frequency to cause said first counter to count down from its said preset select count at least the number of pulses to reach its said second select minimum count during said limited pre-exposure measurement period such that the frequency of said other digital pulse train which controls the rate at which said up/down counter means counts down is maximized at a value equal to the clock pulse frequency divided by two times said select minimum count.

7. The improvement of claim 6 wherein said means for decoding and resetting said second counter comprises logic gating means connected to receive the binary output signal levels from the output terminals of said second counter and to switch to an assertive binary output signal level upon the detection of a zero binary output count from said second counter, a monostable multivibrator connected to receive the output signal from said logic gating means and to provide an output pulse of predetermined duration in response to said assertive signal from said gating means wherein the leading edge of said output pulse train from said monostable multivibrator operates to preset said second counter with the binary down count output signal from said first counter and the trailing edge thereof operates to enable said second counter to start counting down again, and a flip-flop connected to be triggered to switch its output binary signal level in response to the leading edge of the output pulse from said monostable multivibrator.

8. The improvement of claim 4 wherein said first level of ambient scene light intensity substantially corresponds to the maximum level of ambient scene light intensity which will have a negligible exposure influence during the maximum exposure interval allowable without incurring adverse blurring effects from the normally expected hand motion of the photographer, and wherein said second level of ambient scene light intensity substantially corresponds to the minimum level of ambient scene light intensity which by itself will still provide a generally adequate exposure during the maximum exposure interval allowable without incurring adverse blurring effects from the normally expected hand motion of the photographer for a selected film speed and exposure aperture size.

9. A method for controlling the exposure of a photosensitive recording medium using a source of artificial illumination and a shutter arrangement actuatable at least initially to provide progressively increasing aperture values at a predetermined rate during an exposure interval within which scene light is transmitted to the photosensitive medium following actuation of said shutter arrangement comprising the steps of:

determining the distance range of a photographic subject and defining a range related time interval corresponding to the subject distance;

producing a flash fire signal in response to the lapse of a time period commencing at the initiation of the exposure interval and corresponding to said range related time interval to ignite the source of artificial illumination at an aperture value corresponding to the subject distance; and detecting the intensity of ambient scene light prior to exposure and responding to the pre-exposure detection of ambient scene light above a first select level and below a second level greater than said first select level to progressively vary said lapsed time period at which said flash fire signal is provided in inverse corresponding relation to the progressive variation of said detected ambient scene light between said first and second levels for a determined subject distance.

10. The method of claim 9 further including the steps of responding to the pre-exposure detection of ambient scene light intensity below said first select level to provide a maximum lapsed time period before said flash fire signal and to the pre-exposure detection of ambient scene light intensity above said second select level to provide a minimum lapsed time period before said flash fire signal for the same determined subject distance.

11. The method of claim 9 or 10 wherein the flash fire signal is produced by counting up a binary count during said range related time interval corresponding to the subject distance and thereafter counting back down starting at the commencement of said exposure interval to define said lapsed time period and wherein said lapsed time period is progressively varied by progressively varying the rate at which said binary count is counted down.

12. The method of claim 11 wherein said step of progressively varying said lapsed time period further includes the steps of detecting ambient scene light intensity prior to said exposure interval and for providing a digital pulse train output signal with a frequency corresponding to the intensity of ambient scene light so detected, counting down from a preset binary count the number of pulses in said digital pulse train for a limited pre-exposure measurement period and providing an output signal representative of said binary down count, counting down from said binary down count at a rate determined by a select clock pulse and upon reaching a first select minimum binary output count resetting to again count down from said binary down count at the same rate determined by said select clock pulse to provide another digital pulse train to control the rate at which said counting up and down are performed to define said lapsed time period, the frequency of said other digital pulse train varying as a function of the frequency of said clock pulse and said binary down count such that a progressive increase in the intensity of ambient scene light detected prior to exposure results in a progressive increase in the number of pulses counted down from said preset binary count, a progressive decrease in the time required to count down from said binary down count to said select minimum binary output count, a progressive increase in the frequency of said other pulse train which controls the rate at which said counting down is performed to define said lapsed time period, and hence a progressive decrease in the aperture value at which said flash fire signal is provided.

13. The method of claim 12 wherein the rate at which said binary count is counted up during said range related time interval is responsive to the frequency of said clock pulse and said preset binary count.

14. The method of claim 13 wherein said preset binary count is counted down only to a second select minimum binary output count and wherein upon the pre-exposure detection of ambient scene light intensity below said first select level, there is provided a digital pulse train output signal of sufficiently low frequency to effect substantially no count down from said preset select binary count during said limited pre-exposure measurement period such that the frequency of said other digital pulse train which controls the rate of said counting up and down to define said lapsed time period is minimized at a value equal to said clock pulse frequency divided by two times said preset binary count, and wherein upon the pre-exposure detection of ambient scene light intensity above said second select level, there is provided a digital pulse train output signal of sufficiently high frequency to effect the count down from said preset binary count to said second select minimum binary count during said limited pre-exposure measurement period such that the frequency of said other digital pulse train which controls the rate of said counting up and down to define said lapsed time period is maximized at a value equal to said clock pulse frequency divided by two times said second select minimum binary count.

15. In a photographic exposure control system for use with a source of artificial illumination and for controlling the exposure of a photosensitive recording medium, said system having a shutter arrangement for at least initially providing progressively increasing aperture values at a predetermined rate during an exposure interval within which scene light is transmitted to the photosensitive medium following actuation of said shutter arrangement, means for determining the distance of a photographic subject from said system and for producing a flash fire signal responsive to the determined subject distance at an appropriate follow focus aperture value corresponding to the subject distance during the exposure interval, the improvement comprising means for detecting ambient scene light prior to exposure, and means responsive to the pre-exposure detection of ambient scene light intensity above a first select level and below a second select level greater than said first select level for progressively varying the appropriate follow focus aperture value at which said flash fire signal is provided in inverse corresponding relation to the progressive variation of said detected ambient scene light between said first and second levels for a determined subject distance.

16. The improvement of claim 15 wherein said means for progressively varying the appropriate follow focus aperture further responds to the pre-exposure detection of ambient scene light intensity below said first select level to provide said flash fire signal at a maximum follow focus aperture value and to the pre-exposure detection of ambient scene light intensity above said second select level to provide said flash fire signal at a minimum follow focus aperture value for the same determined subject distance.

* * * * *